United States Patent Office 3,148,109
Patented Sept. 8, 1964

3,148,109
3,3'-SULFONYL-BIS(ALKYL ACRYLATES) AND THEIR USE AS FUNGICIDES
Lee A. Miller, Kirkwood, Mo., assignor to Monsanto Company, a corporation of Delaware
No Drawing. Filed May 28, 1962, Ser. No. 197,891
10 Claims. (Cl. 167—22)

This invention relates to organic sulfur-containing compounds, to biological toxicant compositions containing said compounds, and the use of such compounds as fungicidal and microbiological toxicant compositions.

It is an object of this invention to provide new and useful unsaturated sulfur-containing organic compounds. It is another object of this invention to provide new sulfur-ether containing esters of unsaturated acids. It is a further object of this invention to provide sulfonyl-group containing esters of unsaturated acids. It is a further object of this invention to provide biological toxicant compositions which are particularly effective against fungus and microbiological pests. It is yet another object of this invention to provide methods for killing and for inhibiting the growth of crop-damaging fungus organisms especially those soil-borne and foliage organisms which cause great loss to growing farm products. Other objects, aspects, and advantages of the disclosed compounds, compositions, and methods will become apparent from a reading of the accompanying description and the appended claims.

According to one aspect of this invention there are provided novel sulfur-containing diesters of unsaturated acids of the formula

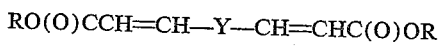

wherein R is an alkyl radical having from 1 to 12 carbon atoms and Y is selected from the group consisting of —S— and —SO$_2$—.

Another aspect of this invention provides new and useful sulfur-ether containing diesters of unsaturated acids of the formula

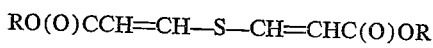

wherein R is an alkyl radical having from 1 to 12 carbon atoms.

Another aspect of this invention provides new and useful sulfonyl-group containing diesters of unsaturated acids of the formula

wherein R is an alkyl radical having from 1 to 12 carbon atoms.

A further aspect of this invention provides biological toxicant compositions which are particularly effective against fungus and microbiological pests which compositions contain a carrier adjuvant, a dispersing agent, and as an essential active ingredient the compound of the formula

wherein R is an alkyl radical having from 1 to 12 carbon atoms.

A further aspect of this invention provides methods for killing and inhibiting the growth of undesired biological pests especially fungus and microbiological organisms by contacting the fungus or microbiological organism, or the normal habitat of said organisms, or the crop to be protected from attack by said organism, with a toxic amount of the compound of the formula

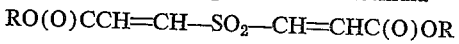

The thio ether containing esters of unsaturated acids of this invention may be prepared by reacting hydrogen sulfide with an alkyl propiolate having the desired number of carbon atoms in the alkyl ester radical of the propiolic acid ester. Generally, for purposes of this invention it is preferred to have from 1 to 12 carbon atoms in said alkyl ester radicals. The reaction between the hydrogen sulfide and the alkyl propiolate is preferably conducted by passing hydrogen sulfide gas into a non-reactive solvent solution of the alkyl propiolates. Suitable solvents include the hydrocarbon solvents such as benzene, toluene, hexane, heptane as well as solvents such as dioxane, ether tetrahydrofuran, acetone, methyl ethyl ketone, etc. The reaction may proceed at normal, elevated, or reduced temperatures say in the range from 10° to the refluxing temperature of the reaction mixture. Temperatures on the order of from about 20° to 50° are generally efficient for most purposes, at atmospheric pressure. Temperatures may vary accordingly as the pressure is raised or lowered.

The reaction between the hydrogen sulfide and the alkyl propiolates involves a simple addition reaction wherein the hydrogen atom bonded to the sulfur atom of the hydrogen sulfide becomes bonded to the carbon atom in the acetylenic group of the propiolic acid ester, that is, one of the carbon atoms of the triple bond group in the alkyl propiolate take up the hydrogen atom from the hydrogen sulfide and the sulfur atom becomes bonded to the other carbon atom forming a double bonded acrylate group. Stoichiometric proportions of the reactant may be used but it is generally preferred to pass slight excess of hydrogen sulfide gas into the reaction mixture to insure complete reaction of the alkyl propiolate reactant.

Examples of alkyl propiolates useful for reacting with the hydrogen sulfide for preparing the 3,3'-thio-bis(alkyl acrylate) of this invention are, for example, the alkyl propiolate esters wherein the alkyl radical is straight or branched chained such as methyl, ethyl, n-propyl, isopropyl, n-butyl, isobutyl, secondary butyl, tertiary butyl, amyl, heptyl, octyl, nonyl, decyl, undecyl, dodecyl radicals including the various alkyl radicals which have been derived from the use of olefins, carbon monoxide, and hydrogen such as is derived from the "oxo" process, such as a decyl radical derived from an alcohol produced from propylene trimer, carbon monoxide, and hydrogen, and a nonyl radical derived from butylene dimer, carbon monoxide and hydrogen. The 3,3'-thio-bis(alkyl acrylate) compounds thus provided by this invention are well defined, usually solid crystalline materials which are generally soluble in ether, acetone, and chloroform but which are insoluble in water. These thioether diesters of acrylic acid as prepared above have been used as polymer intermediate compounds and show some biological toxicant activity of their own, particularly against fungus organisms, but are most useful as intermediates in the preparation of the 3,3'-sulfonyl-bis(alkyl acrylates) as described herein below.

The present 3,3'-sulfonyl-bis(alkyl acrylates) are readily prepared by contacting the appropriate 3,3'-thio-bis (alkyl acrylate) prepared as indicated above with hydrogen peroxide at ordinary or increased temperatures and in the presence of an inert solvent or diluent. Advantageously, reaction is effected in the presence of an unreactive solvent medium such as benzene, heptane, hexane, toluene, or such solvents as glacial acetic acid, dioxane, acetone, methyl ethyl ketone, etc. and at temperatures of from 20° C. to the refluxing temperature of the reaction mixture preferably from 20 to 50° C. As will be shown hereinafter the present 3,3' sulfonyl-bis(alkyl acrylates) are characterized by high biological toxicant activity, particularly against fungus and microbiological organisms. This effect is demonstrated when they are present in treating compositions in very small concentrations, in quantities as low as from 0.5 to 200 parts per million.

Separation of the 3,3'-sulfonyl-bis(alkyl acrylates) from the reaction medium may be accomplished by means known in the art. The products of this aspect of the invention are generally solid materials having well defined chemical characteristics and may be separated by filtration, washing, recrystallization procedures, etc.

Examples of 3,3' sulfonyl-bis(alkyl acrylate) compounds within the scope of this invention and the 3,3'-thio-bis(alkyl acrylates) from which they are derived by treating the respective thio ether with an oxygen-supplying oxidizing agent are:

3,3'-sulfonyl-bis(methyl acrylate) obtained from 3,3'-thio-bis(methyl acrylate),
3,3'-sulfonyl-bis(ethyl acrylate) obtained from 3,3'-thio-bis(ethyl acrylate),
3,3'-sulfonyl-bis(isopropyl acrylate) obtained from 3,3'-thio-bis(isopropyl acrylate),
3,3'-sulfonyl-bis(butyl acrylate) obtained from 3,3'-thio-bis(butyl acrylate),
3,3'-sulfonyl-bis(hexyl acrylate) obtained from 3,3'-thio-bis(hexyl acrylate),
3,3'-sulfonyl-bis(nonyl acrylate) obtained from 3,3'-thio-bis(nonyl acrylate),
3,3'-sulfonyl-bis(undecyl acrylate) obtained from 3,3'-thio-bis(undecyl acrylate), and
3,3'-sulfonyl-bis(dodecyl acrylate) obtained from 3,3'-thio-bis(dodecyl acrylate).

It is intended that as used in the specification and claims the term "sulfone," that is, those compounds having the radical —SO$_2$—, also include the sulfoxides having the radical —SO—. Illustrative sulfoxide compounds of this type within the scope of this invention are 3,3'-sulfinyl-bis(methyl acrylate) prepared by treating 3,3'-thio-bis (methyl acrylate) with an equivalent amount of an oxidizing agent to supply one oxygen atom to each sulfur atom, under controlled temperatures below 50° C. Other examples are:

3,3'-sulfinyl-bis(hexyl acrylate), 3,3'-sulfinyl-bis(nonyl acrylate), and 3,3'-sulfinyl-bis(dodecyl acrylate).

A particular embodiment of this invention provides the above described compounds in biological toxicant compositions as an essential active ingredient therein in an amount sufficient to destroy or inhibit the growth of various biological pests. These compositions are particularly effective as fungicidal and microbiological agents. The active fungicidal and microbiological compositions generally contain fungicidal or microbiological amounts of one or more of the 3,3'-sulfonyl-bis(alkyl acrylate) compounds in a dispersed form in a suitable extending agent. The term "dispersed" is as used herein means that the particles of the 3,3'-sulfonyl-bis(alkyl acrylate) may be molecular in size and held in true solution in a suitable organic solvent. It means further, that the particles may be colloidal in size and distributed throughout a liquid phase in the form of suspensions or emulsions or in the form of particles held in suspension by wetting agents. It also includes particles which are distributed in semi-solid viscous carriers such as petrolatum or soap or other ointment base in which there may be actually dissolved in the semi-solid or held in suspension in the semi-solid with the aid of suitable wetting or emulsifying agents. The term "dispersed" also means that the particles may be mixed with or distributed throughout a solid carrier providing a mixture in particulate form, for example, pellets, granules, powders, or dusts. The term "dispersed" also includes mixtures which are suitable for use as aerosols including solutions, suspensions, or emulsions of the 3,3'-sulfonyl-bis(alkyl acrylate) compounds in a carrier such as dichlorodifluoromethane and like fluorochloroalkanes which boil below room temperature at atmospheric pressure.

As fungicides and as microbiological agents the 3,3'-sulfonyl-bis(alkyl acrylate) compounds may be applied conveniently in the form of a spray containing the 3,3'-sulfonyl-bis(alkyl acrylate) in a concentration within the range of 0.001% to 10% by weight. Although they are insoluble in water, they are soluble in organic solvents, they may be dispersed directly in water or in a solution in an organic solvent emulsified in an aqueous medium by the aid of a dispersing agent. If application in dust form is preferred, they may be diluted with a carrier such as clay, talc or bentonite. The 3,3'-sulfonyl-bis(alkyl acrylates) are effective soil sterilizing agents especially for the reduction of the population of fungus organisms. This invention thus provides a method for controlling fungus organisms wich may be practiced by any method which accomplishes dispersion of the 3,3'-sulfonyl-bis(alkyl acrylates) in the soil. Any of the well known procedures for effecting these results may be utilized; for example, by injecting the compound, or formulations containing the compound into the soil, by depositing the substance or formulation on the surface of the soil and dispersing them within the soil by a conventional mechanical equipment, and by drenching the soil with a solution or liquid dispersion in water.

The 3,3'-sulfonyl-bis(alkyl acrylates) are also very effective foliage fungicides being especially effective on vegetable and fruit plants in preventing damage by fungus organisms.

Examples of types of fungus organisms controlled by the compound of this invention are the soil born pathogens such as *Rhizoctonia solani, Fasarium oxysporum* f. *vasinfectum, Verticillium albo-atrum, Sclerotium rolfsii, Pythium ultimum, Fusarium moniliforme* and the foliage fungi represented, e.g., by *Venturia inaequalis, Phytophthora infestans, Alternaria solani.*

The microbiological utility of the present compounds i.e., the bacteriostatic and fungistatic effect, is illustrated against such organisms as *Micrococcus Pyogenes* var. *aureus, Aspergillus niger, Salmonella typhosa, Pseudomonas aeruginosa, Candida albicans,* and *Tricophyton memtagrophytes.*

When the 3,3'-sulfonyl-bis(alkyl acrylate) compounds are used as soil fungicides, the treatment of the soil must necessarily involve incorporation of an amount sufficient to destroy or inhibit the fungus organisms therein. Some variation will be observed with different soil types and some differences in rate of application will be dictated by the sensitivity of some plants to the compounds. An additional advantage of the compounds of this invention, however, is the ability of such compounds to act as systemic fungicides, that is, the compounds translocate in the plant system and control fungus organisms feeding thereon. These compounds may be added to the soil in solid formulations, frequently referred to as dusts, which may contain in addition to the active ingredient, diluents, or extenders to absorb the toxicant compounds and thereby prevent too rapid dissipation, and dispersing agents to prevent local high concentrations. In addition, these components facilitate the distribution of the active ingredients in soil and soil waters.

Suitable solid diluents are those which render the compositions dry and permanently free flowing. Thus, hygroscopic materials should be avoided. Effective solid diluents are the finely divided carriers, including the clays such as the kaolinites, the bentonites, and the attapulgites; other minerals in natural state, such as talc, pyrophillite, quartz, diatomaceous earth, fuller's earth, chalk, rock phosphate, and sulfur; in chemically modified agents such as acid washed bentonites, precipitated calcium phosphates, precipitated calcium carbonate and colloidal silica. These diluents may represent a substantial portion, for example, 50% to 98% by weight of the entire formulation.

Liquid compositions for fungicidal uses may be solutions or liquid dispersions. The choice of the liquid medium will depend to a great extent upon the physical properties of the active ingredient. It is frequently desirable to add a small amount of an organic solvent which can be readily dispersed in an aqueous medium to produce a heterogeneous dispersion of the active ingredient in water.

From an economical point of view the manufacturer must supply the argiculturist with a low concentrate or spray base or particulate solid base in such form that by merely mixing with water or solid extender (for example powdered clay or talc) or other low cost material available to the agriculturist at the point of use, he will have an easily prepared fungicidal or microbiological spray or particulate solid composition. In such a concentrate composition, the 3,3'-sulfonyl-bis(alkyl acrylate) generally will be present in a concentration of from 5–90% by weight, the residue being any one of one or more of the well known biological toxicant adjuvants, such as the various surface active agents (for example, detergents, soap, or the other emulsifying or wetting agents, surface active clays), solvents, diluents, carrier media adhesives, spreading agents, humectants, and the like.

There are a large number of organic liquids which can be used for the preparation of solutions, suspensions, or emulsions of these compounds; for example, there can be used isopropyl ether, acetone, methyl ethyl ketone, dioxane, cyclohexanone, carbon tetrachloride, ethylene dichloride, tetrachloroethane, hexane, heptane, and similar higher liquid alkanes, hydrogenated naphthalenes, solvent naphtha, benzene, toluene, xylene, petroleum fractions (e.g., those boiling almost entirely under 400° F. at atmospheric pressure and having a flash point above about 80° C., particularly kerosene), mineral oils having an unsulfonatable residue above about 80 percent and preferably above about 90 percent. In these instances wherein there may be concern about the phytotoxicity of the organic liquid extending agent, a portion of the same can be replaced by such low molecular weight aliphatic hydrocarbons as dipentene, diisobutylene, propylene trimer, and the like. In certain instances it is advantageous to employ a mixture of organic liquids as the extending agent.

When supplied to the situs of the biological pest in the form of emulsions or suspensions, the biological toxicant composition containing one or more 3,3′-sulfonyl-bis(alkyl acrylates) as the active ingredient may be prepared by dispersing the active component either per se or in the form of an organic solution thereof in water with the aid of a water-soluble surfactant. The term "surfactant" is employed here and in the appended claims is used as in volume II of Schwartz, Perry and Berch's "Surface Active Agents and Detergents" (1958 Interscience Publishers, Inc., New York) in place of the expression "emulsifying agent" to connote generically the various "emulsifying agents," "dispersing agents," "wetting agents," and "spreading agents" that are adapted to be admixed with the active compounds of this invention in order to secure better wetting and spreading of the active ingredients in the water vehicle or carrier in which they are insoluble by lowering the surface tension of the water (see also Frear "Chemistry of Insecticides, Fungicides, and Herbicides," second edition, page 280). These surfactants include the well-known capillary-active substances which may be anion-active (or anionic), cation-active (or cationic), or non-ionizing (or non-ionic) which are described in detail in volumes I and II of Schwartz, Perry and Berch's "Surface Active Agents and Detergents," cited supra, and also in the November 1947 issue of Chemical Industries (pages 811–824) in an article entitled "Synthetic Detergents," by John W. McCutcheon, and also in the July, August, September, and October 1952 issues of Soap and Sanitary Chemical under the title "Synthetic Detergents." The disclosures of these articles with respect to surfactants are incorporated in this specification by reference in order to avoid unnecessary enlargement of this specification. The preferred surfactants are the water soluble anionic surface active agents set forth in U.S. 2,846,398 (issued August 5, 1958). In general it is preferred that a mixture of water soluble anionic and water soluble non-ionic surfactants be employed.

In all of the forms described above the dispersions can be provided ready for use in combatting biological pests in general and fungus and microbiological pests in particular. However, they can also be provided in a concentrated form suitable for mixing with or dispersing in other extending agents. As illustrative of a particularly useful concentrate is an intimate mixture of a 3,3′-sulfonyl-bis(alkyl acrylate) of this invention with a water soluble surfactant which lowers the surface tension of water in the weight proportions of 0.1 to 15 parts of surfactant with sufficient of the 3,3′-sulfonyl-bis(alkyl acrylate) to make 100 parts by weight. Such a concentrate is particularly adapted to be made into a spray for combatting various forms of fungus organisms by the addition of water thereto. An example of such a concentrate is an intimate mixture of 95 parts by weight of 3,3′-sulfonyl-bis(methyl acrylate) and 5 parts by weight of a water soluble non-ionic surfactant such as polyoxyethylene ether. Another example of a useful fungicidal concentrate composition is one having from 2 to 4 pounds of the 3,3′-sulfonyl-bis(alkyl acrylate) dissolved in sufficient organic solvent such as kerosene, xylene, naphtha, etc., containing from 1 to 10% of a surface active agent blend to make a gallon of fungicide concentrate composition. The surface active agent blend may comprise, e.g., a mixture of a non-ionic surface active agent such as a polyoxyethylene ether and an anionic surface active agent such as an alkyl aryl sulfonate.

A useful fungicidal and bactericidal formulation of these active compounds may involve the solid or liquid concentrate of the 3,3′-sulfonyl-bis (alkyl acrylate) through which has been added formulation aids or conditioning agents so that the concentrates may be mixed with a suitable extender or diluent in the field at the time of use. Obviously, for this purpose the dispersing agent will be present in larger concentrations so that upon dilution with water or a solid extender, compositions containing optimum proportions of dispersing agent and active component will be prepared. The solid or liquid formulations are preferably applied by mechanical equipment involving spraying or spreading the formulation on soil and foliage being treated. For this purpose readily flowable compositions are required, either liquid or solid in physical state. Thus, a critical aspect of the invention is the fluent carrier by use of which optimum fungicidal and bactericidal effects can be obtained.

The following examples illustrate methods for preparing the compounds of this invention and the activity of such compounds as fungicidal and bactericidal agents. These examples are illustrative only and are not meant to limit the scope of the invention.

EXAMPLE 1

Into a stirred mixture of 16.8 g. (0.2 mole) of methyl propiolate, 3 drops of N-methylmorpholine and 200 ml. of benzene, hydrogen sulfide was bubbled rapidly at room temperature. During the first several minutes of the addition, the temperature rose slowly from 22° to 26° C. and then after 1 minute receded to 22° C. $H_2S$ gas was bubbled in for a total time of 15 minutes and then the reaction mixture was stirred overnight to insure complete reaction. The reaction mixture was filtered to give 10.6 g. of crude 3,3′-thiobis(methyl acrylate) as precipitate. The precipitate was purified by recrystallization from acetone. Samples recrystallized from acetone give needles.

A pure sample of product, recrystallized three times from acetone, M.P. 143.5°–144° C., analyzed as containing 47.60% carbon, and 5.17% hydrogen as compared with a carbon content of 47.51% and a hydrogen content of 4.98%, the calculated values.

EXAMPLE 2

To a solution of 8.0 g. (0.04 mole) of 3,3'-thiobis-(methyl acrylate) in 50 ml. of glacial acetic acid held at 70° C.±10° C. excess hydrogen peroxide was added dropwise over a 15 minute period with occasional swirling of the mixture. An exothermic reaction set in driving the temperature to 90° C. despite water bath cooling. The temperature was thereafter maintained at 70° C.±10° C. for 75 minutes to insure complete reaction and then the reaction mixture was poured into 250 ml. of ice water. A colorless precipitate product was filtered, and washed with 350 ml. of water. The precipitate was recrystallized from acetone to obtain 9.4 g. of pure 3,3'-sulfonylbis(methyl acrylate) M.P. 148–149° C., which analyzed as containing 41.18% carbon and 4.25% hydrogen as compared with 40.90% carbon and 4.30% hydrogen, the calculated values for $C_8H_{10}O_6S$.

EXAMPLE 3

This example illustrates the surprising effectiveness of 3,3'-sulfonylbis(alkyl acrylates) as fungicides as compared with corresponding 3,3'-thiobis(alkyl acrylates) against the apple scab fungus, *Venturia inaequalis*.

In a primary screening test which involves the observation of the effect of the test chemical at a standard concentration against the spore germination of test fungus organism, such as *Venturia inaequalis* the following procedure was used.

A solution, dispersion, or suspension of the test chemical was pipetted into depressed glass slides and a spore suspension of the test organism was then pipetted into it at such rates that the final concentration of spores and of chemical were the ones desired. The effect of the chemical upon the spore germination were used as a measure of fungitoxicity. A rating system of 1, 2, and 5 was used for scoring fungicidal activity. The meaning of these number scores are as follows:

*Fungicide Activity*

(1) No germination
(2) Germ tube more than ½ length of spore but no longer than spore
(5) 100% germination germ tubes 10× length of spore Using the above test procedure against the conidia spores of *Venturia inaequalis*, an Ascomeycete, 1 drop of a solution of the test chemical (at 30 p.p.m.) was pipetted from a 0.1 ml. pipette into the slide wells of the test slides. Then two drops of the spore suspension were pipetted in a similar manner into the chemical solution. The final concentration of the test chemical is 10 p.p.m. The test slides are floated on 5 ml. of distilled water in a petri dish, the slides of the dishes are closed and the test is incubated at 22° C. for 24 hours.

Using this test procedure 3,3'-thiobis-(methyl acrylate) was given a rating of 5, indicating very severe disease whereas 3,3'-sulfonylbis(methyl acrylate) was given a rating of 1, indicating no disease.

EXAMPLE 4

This example illustrates the effectiveness of 3,3'-sulfonylbis(alkyl acrylates) against various fungus organisms.

3,3'-sulfonylbis(methyl acrylate) was tested against the fungi *Alternaria solani*, *Phytophthora infestans*, on tomato plants and *Venturia inaequalis* on apple seedlings by spraying solutions of the compound at repeatedly lower concentrations on the plant, and then 24 hours later sprayed with innoculum consisting of spore suspensions of the respective fungus. The plants were then incubated for 24–48 hours in a constant temperature-humidity chamber and then transferred to the greenhouse where readings of the incidence and severity of the disease are made.

The rating score system used was as follows in terms of control of the fungus disease by the test compound as compared with control of the disease by a commercial standard.

(1) Very superior control relative to commercial standard
(2) Superior control relative to commercial standard
(3) Equal control relative to commercial standard According to the above defined test 3,3'-sulfonylbis-(methyl acrylate) was given a rating of 3 at 30 parts per million against the fungus *Venturia inaequalis*, which was the same rating (3) given the commercial standard, the compound

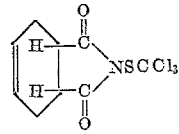

at concentration of 100 p.p.m.

Against the fungi *Phytophora infestans* and *Alternaria solani* on tomato plants, 3,3'-sulfonylbis(methyl acrylate) was given a rating of 3 at 30 p.p.m. relative to the commercial standard manganese ethylenebis(dithiocarbamate) at that rate.

EXAMPLE 5

This example illustrates the effectiveness of 3,3'-sulfonylbis(alkyl acrylates) as chemo-therapeutic fungicides against fungus organisms.

3,3'-sulfonylbis(methyl acrylate) was tested against the fungus *Venturia inaequalis* by spraying solutions of the compound at repeatedly lower concentrations, in respective tests on apple seedling plants which had previously been infected with the fungus disease. The treated seedling plants were then observed 24 hours later for signs of control of the disease. The same scoring system was used as is described in Example 4.

The results were as follows:

| Compound | Concentration, p.p.m. | Control Rating |
|---|---|---|
| 3,3'-sulfonylbis(methyl acrylate) | 100 | 2 |
|  | 30 | 2 |
| Commercial standard [1] | 100 | 3 |

[1] The compound:

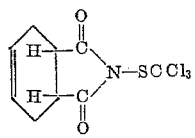

The present 3,3'-sulfonyl-bis(alkyl acrylates) are effective in eliminating and controlling fungus activity when applied to the foliage of crops at a rate of from 0.5 to 5% by weight based on the weight of the total composition and when applied to soil at a rate of from 1 to 100 lbs. per acre.

Variation and modification of the invention as described can be made, the essence of which is that there have been provided (1) new 3,3'-thio-bis(alkyl acrylate) compounds, (2) new 3,3' - sulfonyl-bis(alkyl acrylate) compounds, (3) biological toxicant composition comprising as an essential active ingredient 3,3'-sulfonyl-bis-(alkyl acrylate) compounds and (4) methods for controlling biological pests by applying to the situs of said pests a toxic quantity of the compounds of this invention.

I claim:
1. A compound of the formula

$$RO(O)CCH=CH-SO_2-CH=CHC(O)OR$$

wherein R is an alkyl radical having from 1 to 12 carbon atoms.

2. 3,3'-sulfonyl-bis(methyl acrylate).

3. A fungicidal composition comprising a surface active agent and as an essential active ingredient, a compound of the formula

RO(O)CCH=CH—SO₂—CH=CHC(O)OR wherein R is an alkyl radical having from 1 to 12 carbon atoms.

4. A fungicidal composition as described in claim 3 wherein the essential active ingredient is the compound 3,3'-sulfonyl-bis(methyl) acrylate).

5. A method for preventing the growth of fungus organisms which comprises contacting the fungus organisms with a toxic amount of a compound of the formula

RO(O)CCH=CH—SO₂—CH=CHC(O)OR wherein R is an alkyl radical having from 1 to 12 carbon atoms.

6. A method according to that described in claim 5 wherein R is a methyl radical.

7. A method of protecting apple trees against damage by fungus organisms which comprises applying to the apple trees a quantity of a compound of the formula

RO(O)C—CH=CH—SO₂—CH=CHC(O)OR wherein R is an alkyl radical having from 1 to 12 carbon atoms, which quantity of the compound is toxic to fungi.

8. A method according to claim 7 wherein R is a methyl radical.

9. A method of protecting tomato plants against damage by fungus organisms which comprises applying to the tomato plant a quantity of a compound of the formula

RO(O)CCH=CH—SO₂—CH=CHC(O)OR where R is an alkyl radical having from 1 to 12 carbon atoms, which quantity of the compound is toxic to fungi.

10. A method as described in claim 9 wherein R is a methyl radical.

References Cited in the file of this patent
UNITED STATES PATENTS

| | | |
|---|---|---|
| 2,560,421 | Eby | July 10, 1951 |
| 3,082,244 | Miller | Mar. 19, 1963 |

OTHER REFERENCES

Scheibler et al.: Berichte der Deutschen Chemischen Gesellschaft, vol. 48, pages 1445–1461 (1915).

Nishikiori et al.: Chemistry of High Polymers 8, 253–6 (1951).

Bryan et al.: Nature 158, 876 (1946).